US010864812B2

(12) United States Patent
Witt et al.

(10) Patent No.: US 10,864,812 B2
(45) Date of Patent: Dec. 15, 2020

(54) GEARBOX ARRANGEMENT FOR A VEHICLE, AND VEHICLE HAVING THE SAME

(71) Applicant: Schaeffler Technologies AG & Co. KG, Herzogenaurach (DE)

(72) Inventors: Holger Witt, Bühl (DE); Martin Vornehm, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/061,805

(22) PCT Filed: Dec. 1, 2016

(86) PCT No.: PCT/DE2016/200571
§ 371 (c)(1),
(2) Date: Jun. 13, 2018

(87) PCT Pub. No.: WO2017/101938
PCT Pub. Date: Jun. 22, 2017

(65) Prior Publication Data
US 2019/0270370 A1    Sep. 5, 2019

(30) Foreign Application Priority Data

Dec. 18, 2015  (DE) .................. 10 2015 226 008

(51) Int. Cl.
*B60K 6/365*       (2007.10)
*B60K 6/48*        (2007.10)
(Continued)

(52) U.S. Cl.
CPC ............. *B60K 6/365* (2013.01); *B60K 6/387* (2013.01); *B60K 6/445* (2013.01); *B60K 6/48* (2013.01);
(Continued)

(58) Field of Classification Search
CPC .......... B60K 6/365; B60K 6/48; B60K 6/547; B60K 2006/4816; F16H 3/725; F16H 37/042; B60Y 2200/92; B60Y 2400/73
See application file for complete search history.

(56) References Cited

U.S. PATENT DOCUMENTS 6,527,659 B1 *   3/2003  Klemen .................. B60K 6/26
                                                       475/2
2005/0137042 A1 *  6/2005  Schmidt ................ B60K 6/387
                                                       475/5
(Continued)

FOREIGN PATENT DOCUMENTS

CN        101535680 A       9/2009
CN        101898509 A      12/2010
(Continued)

OTHER PUBLICATIONS

International Search Report for PCT/DE2016/200571, Completed by the European Patent Office dated Mar. 6, 2017, 3 pages.

*Primary Examiner* — Derek D Knight
(74) *Attorney, Agent, or Firm* — LeKeisha M. Suggs

(57) ABSTRACT

A transmission for a vehicle includes a first input interface, an output interface, first and second speed ratio transmission sections, first and second planetary transmission sections, and a coupling section. The first input interface is arranged for coupling to an internal combustion engine. The speed ratio transmission sections have respective inputs, respective outputs operatively connected to the output interface, and respective ratio stages. The first planetary transmission section has a first planet carrier arranged on a second shaft. The second planetary transmission section has a second planet carrier arranged on a fifth shaft. The coupling section is for coupling the second shaft and the fifth shaft such that they are supported against one another in at least one operating mode. The first planetary transmission section and (Continued)

the second planetary transmission section are arranged coaxially with respect to one another.

12 Claims, 10 Drawing Sheets

(51) Int. Cl.
    *B60K 6/547*         (2007.10)
    *F16H 3/72*          (2006.01)
    *F16H 37/04*        (2006.01)
    *B60K 6/387*        (2007.10)
    *B60K 6/445*        (2007.10)
    *F16H 3/00*          (2006.01)
    *B60K 6/38*          (2007.10)

(52) U.S. Cl.
    CPC ............. *B60K 6/547* (2013.01); *F16H 3/006* (2013.01); *F16H 3/725* (2013.01); *F16H 3/728* (2013.01); *F16H 37/042* (2013.01); *B60K 2006/381* (2013.01); *B60K 2006/4816* (2013.01); *B60Y 2200/92* (2013.01); *B60Y 2400/73* (2013.01); *F16H 2200/2007* (2013.01); *Y02T 10/62* (2013.01)

(56) References Cited

U.S. PATENT DOCUMENTS

| | | | |
|---|---|---|---|
| 2005/0227801 A1 | 10/2005 | Schnidt et al. | |
| 2006/0105876 A1* | 5/2006 | Holmes | B60K 6/365 |
| | | | 475/5 |
| 2013/0312557 A1 | 11/2013 | Vandruten et al. | |

FOREIGN PATENT DOCUMENTS

| | | |
|---|---|---|
| CN | 103502691 A | 1/2014 |
| CN | 104309466 A | 1/2015 |
| CN | 104930139 A | 9/2015 |
| DE | 19903936 A1 | 5/2000 |
| DE | 102012201376 A1 | 8/2013 |
| DE | 102012201377 A1 | 8/2013 |
| DE | 112012006192 A1 | 12/2014 |
| FR | 3014773 A1 | 6/2015 |
| WO | 2015142268 A1 | 9/2015 |

* cited by examiner

GEARBOX ARRANGEMENT FOR A VEHICLE, AND VEHICLE HAVING THE SAME

CROSS-REFERENCE TO RELATED APPLICATIONS

This application is the United States National Phase of PCT Appln. No. PCT/DE2016/200571 filed Dec. 1, 2016, which claims priority to German Application No. DE102015226008.9 filed Dec. 18, 2015, the entire disclosures of which are incorporated by reference herein.

TECHNICAL FIELD

The disclosure relates to a transmission arrangement for a vehicle.

BACKGROUND

Hybrid transmissions for vehicles permit both the coupling of internal combustion engines and of electric motors as traction motors. Vehicles with hybrid transmissions of said type can normally be operated purely electrically, purely by internal combustion engine and also in a hybrid mode. Such hybrid transmissions are known for example from the documents DE 11 2012 006 192, DE 10 2012 20 13 76 or from DE 10 2012 20 13 77. All architectures of the hybrid transmission are based on the fundamental object of developing a hybrid transmission which constitutes an advantageous solution both with regard to the outlay in terms of construction and with regard to the possible functions and operation types.

BRIEF SUMMARY

The subject matter is a transmission arrangement, for example, a hybrid transmission arrangement for a vehicle. The vehicle may in particular be a passenger motor vehicle, heavy goods vehicle, bus etc. The transmission arrangement forms a part of the drivetrain and is designed to conduct a traction torque to driven wheels of the vehicle.

The transmission arrangement has a first input interface for the coupling of an internal combustion engine. The internal combustion engine optionally forms a part of the transmission arrangement. The internal combustion engine provides a traction torque for the vehicle. The first input interface may be in the form of a real interface, or alternatively to this, the first input interface is formed as a virtual or logical interface and is manifested for example as a shaft or the like.

The transmission arrangement has a first planetary transmission section which has a first internal gear, a first planet carrier and a first sun gear as shafts. Furthermore, the first planetary transmission section may have a first set of planet gears, which are rotatably mounted on the first planet carrier. In particular, the first internal gear and/or the first sun gear meshes with the planet gears of the first set of planet gears. The internal gear, planet carrier and sun gear will hereinafter be referred to as shafts. The expression "shaft" may also be applied to a shaft that is static during operation. A first of the three shafts of the first planetary transmission section is operatively connected to the first input interface. The first shaft may be rotationally fixedly connected or at least rotationally fixedly connectable to the first input interface. The first planetary transmission section may be formed as a spur-gear planetary transmission section. The first internal gear, the planet gears and the first sun gear are formed as gears which are toothed in encircling fashion and/or on the face side.

Furthermore, the transmission arrangement has a second planetary transmission section which have a second internal gear, a second planet carrier, in particular with a second set of planet gears which are rotatably mounted on the second planet carrier, and a second sun gear as shafts. The shafts may be formed as rotating or static shafts. A first shaft of the second planetary transmission section is operatively connected to the first input interface. The first shaft of the second planetary transmission section may be rotationally fixedly connected to the first input interface.

The transmission arrangement furthermore has a first speed ratio transmission section, which provides at least one speed ratio stage. The first speed ratio transmission section may provide two, three or more speed ratio stages. The speed ratio may be any desired speed ratio; in particular, it is also possible for a speed reduction to be implemented by means of the speed ratio transmission section. A third shaft of the first planetary transmission section is operatively connected to an input of the first speed ratio transmission section. The third shaft of the first planetary transmission section may be rotationally fixedly connected to the input of the first speed ratio transmission section.

Furthermore, the transmission arrangement has a second speed ratio transmission section. The second speed ratio transmission section has at least one second speed ratio stage, and may have a multiplicity of second speed ratio stages. The third shaft of the second planetary transmission section is operatively connected, in particular rotationally fixedly connected, to an input of the second speed ratio transmission section.

Furthermore, the transmission arrangement has an output interface. The outputs of the speed ratio transmission sections are operatively connected to the output interface.

It is thus possible for a traction torque to be conducted into the transmission arrangement via the first input interface and to be conducted out via the output interface. For example, the output interface may be adjoined by an output transmission stage, in particular a final drive, and/or a differential device for distributing the transmitted traction torque to axles of the vehicle or to wheels of a driven axle. The output transmission stage and/or the differential device optionally form a part of the transmission arrangement.

The transmission arrangement has a (real or virtual) coupling section for the coupling of the second shafts of the planetary transmission sections. The second shafts are in particular supported against one another via the coupling section in at least one operating mode. By means of the coupling section, advantageous operation types can be set in the transmission arrangement if the second shafts act counter to one another in at least one operating mode. Examples of such advantageous operating modes (or operation types) will be discussed in more detail below.

In an example embodiment, the coupling section is formed and/or arranged such that, in the case of a co-directional torque at the first shafts of the two planetary transmission sections and a co-directional torque at the third shafts of the planetary transmission sections, the torques at the second shafts act in opposite directions. The mutual support is realized as a result of the action in opposite directions.

In the context of the disclosure, it is proposed that the first and the second planetary transmission section are arranged coaxially with respect to one another. In particular, the axes of rotation of the sun gears and/or of the planet gears and/or of the internal gears are arranged coaxially with respect to one another.

In an example embodiment, that at least one shaft of the first planetary transmission section are rotationally fixedly coupled or couplable to at least one shaft of the second planetary transmission section and to the input shaft to one another via a common input shaft. By means of this structural design, it is possible for the transmission arrangement to be implemented in a particularly compact manner in the coaxial design. The first input interface as the input shaft may be rotationally fixedly coupled or couplable to the internal gears of the planetary transmission sections.

In an example embodiment, the speed ratio transmission sections are also arranged coaxially with respect to the planetary transmission sections. This refinement makes it possible to further develop the coaxial construction of the transmission arrangement. In each case at least one wheel of the speed ratio transmission sections may be arranged coaxially with respect to the planetary transmission sections and/or with respect to the input shaft.

In an example embodiment, the planetary transmission sections engage around the speed ratio transmission sections in a bracket-like manner, and/or at both sides, in an axial direction in particular with respect to the input shaft. This design embodiment permits a symmetrical and very compact construction of the transmission arrangement.

In an example embodiment, the transmission arrangement has one or two second input interfaces for the coupling of in each case one electric motor. The electric motor optionally forms a part of the transmission arrangement. The electric motor provides a traction torque for the vehicle. In particular, the electric motor is designed such that it alone can accelerate and/or propel the vehicle. The electric motor may have a power of greater than 5 kilowatts, or greater than 10 kilowatts. The second input interface may also be of real physical form, or alternatively to this, may form a virtual or logical interface, as has already been discussed with regard to the first input interface. The transmission arrangement optionally has two second input interfaces for the coupling of two electric motors.

The second shaft of the first planetary transmission section may be operatively connected to the second input interface or to one of the second input interfaces. The second shaft may be rotationally fixedly connected to said input interface. The second shaft of the second planetary transmission section may be operatively connected, or rotationally fixedly connected, to the second input interface or to the other of the second input interfaces.

In an example embodiment, the coupling section is formed as, or has, a transmission section with a negative speed ratio. As a result of the negative speed ratio, a direction of rotation reversal occurs in the transmission section, such that the second shafts can be supported against one another in the at least one operating mode.

The coupling section may be formed as a mechanical coupling section. The second shafts are mechanically positively guided with one another. If the transmission arrangement has two second input interfaces for two electric motors, the coupling section may be designed as a virtual coupling section. The mutual support of the second shafts is realized through actuation of the electric motors.

In an example design embodiment of the disclosure, the first shaft of the first planetary transmission section is formed as the first internal gear, the second shaft of the first planetary transmission section is formed as the first sun gear, the third shaft of the first planetary transmission section is formed as the first planet carrier. Alternatively or in addition, the first shaft of the second planetary transmission section is formed as the second internal gear, the second shaft of the second planetary transmission section is formed as the second sun gear, and the third shaft of the second planetary transmission section is formed as the second planet carrier. In this embodiment, it is firstly necessary for the fixed-carrier speed ratios of the planetary transmission section to be set in accordance with the application, and it is secondly the case that a compact construction is possible.

In principle, it may be provided that a deceleration torque and/or a braking torque is applied to at least one of the second shafts by means of the electric motor or by means of the electric motors, which likewise act(s) on the second shafts via the second input interface. In an example embodiment, the transmission arrangement has a coupling brake device. The coupling brake device acts on the coupling section. In particular, the coupling brake device decelerates at least one of the second shafts or both second shafts in relation to a frame or a housing of the transmission arrangement. In this way, it is possible for the coupling section to be set into a rigid state and/or blocked, such that the second shafts cannot be rotated relative to one another.

In an example embodiment, the transmission arrangement has at least or exactly one output-side coupling actuator apparatus, which comprises a or the coupling brake device. Inputs of the output-side coupling actuator apparatus are operatively connected, in particular rotationally fixedly connected, to the second and to the third shaft of one of the planetary transmission sections, that is to say the first or the second planetary transmission section. The output-side coupling actuator apparatus is designed to rotationally fix the second and the third shaft to one another, such that these can rotate conjointly if appropriate. In an alternative shift state, the output-side coupling actuator apparatus is designed to rotationally fix the second shaft with respect to a frame and in particular a housing of the transmission arrangement and thus form the coupling brake device. Further operating modes of the transmission arrangement can be set by means of the output-side coupling actuator apparatus.

Alternatively or in addition, the transmission arrangement has at least one input actuator apparatus. The input actuator apparatus is arranged between the first input interface and the first shaft of one of the planetary transmission sections. The transmission arrangement optionally has two input actuator apparatuses, such that an input actuator apparatus is connected upstream of each of the first shaft. The input actuator apparatus is designed to rotationally fix the first input interface to the first shaft, and alternatively rotationally fix the first shaft with respect to a frame, in particular with respect to a housing of the transmission arrangement.

Both the output-side coupling actuator apparatus and the input actuator apparatus may also, as optional operating states, assume a neutral state. The inputs of the coupling actuator apparatus and of the input actuator apparatus are shifted independently of one another.

In another possible refinement, the transmission arrangement has two output-side coupling actuator apparatuses and two electric motors, such that the electric motors form a virtual coupling and/or a virtual coupling section.

A further possible subject matter of the disclosure relates to a vehicle having the transmission arrangement as described above or as claimed in one of the preceding claims.

BRIEF DESCRIPTION OF THE DRAWINGS

Further features, advantages and effects of the disclosure will emerge from the following description of exemplary embodiments of the disclosure and from the appended figures. In the drawing.

DETAILED DESCRIPTION

Figure 1:
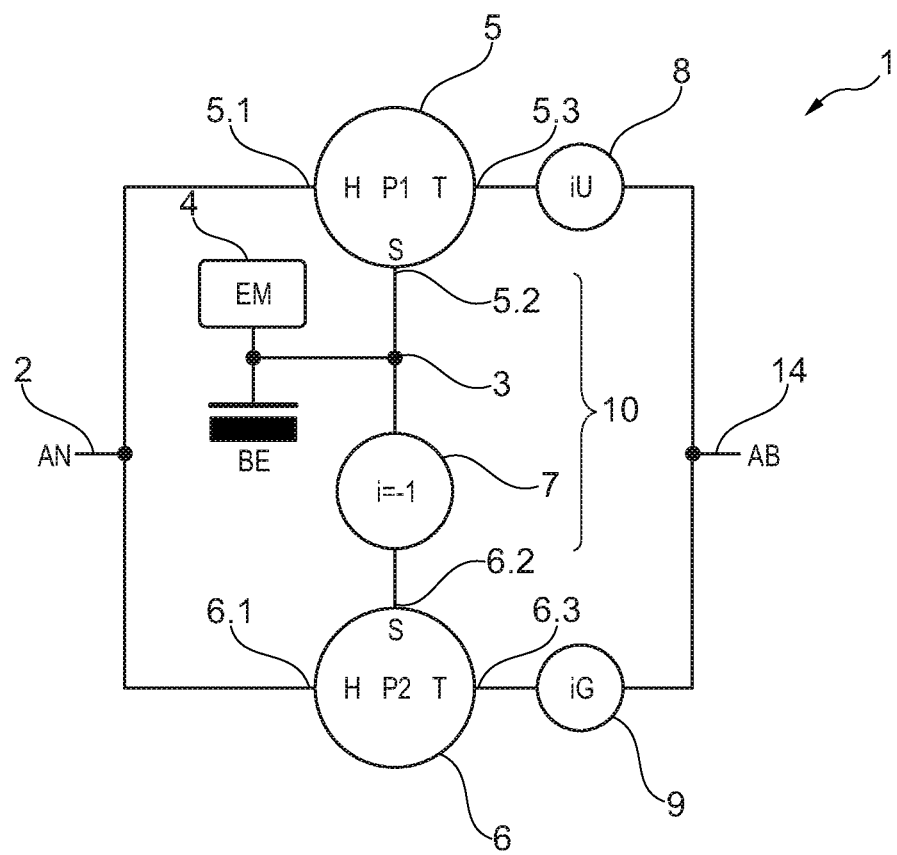
FIG. 1 shows a schematic illustration of a transmission arrangement as an exemplary embodiment of the disclosure.

FIG. 1 shows, in a schematic diagrammatic illustration, a transmission arrangement 1 as a first exemplary embodiment. The transmission arrangement 1 has a first input interface 2 (AN) for the coupling of an internal combustion engine (not illustrated), and a second input interface 3 for the coupling of an electric motor 4.

The transmission arrangement 1 furthermore has a first planetary transmission section 5 (P1) and a second planetary transmission section 6 (P2). The first transmission section 5 has an internal gear 5.1 as a first shaft, a sun gear 5.2 as a second shaft and a planet carrier 5.3 as a third shaft. On the planet carrier 5.3, there are rotatably arranged planet gears, which mesh with the internal gear 5.1 and with the sun gear 5.2.

Similarly, the second planetary transmission section 6 has an internal gear 6.1 as a first shaft, a sun gear 6.2 as a second shaft and a planet carrier 6.3 as a third shaft. On the planet carrier 6.3, there are seated planet gears, which mesh with the internal gear 6.1 and with the sun gear 6.2.

The internal gears 5.1, 6.1 are rotationally fixedly connected to the first input interface 2. The sun gears 5.2, 6.2 are operatively connected to the second input interface 3. The sun gear 5.2 is rotationally fixedly connected to the second input interface 3. The sun gear 6.2 is connected to the second input interface 3 via a transmission section 7. The transmission section 7 has a speed ratio of $i=-1$. The transmission section 7 forms a coupling section 10 between the sun gears 5.2, 6.2.

The transmission arrangement 1 furthermore has a first speed ratio transmission section 8 (iU) and a second speed ratio transmission section 9 (iG). Both speed ratio transmission sections 8, 9 have in each case at least one, and potentially multiple, speed ratio stages. The inputs of the speed ratio transmission sections 8, 9 are in each case rotationally fixedly connected to the third shafts, in particular to the planet carrier 5.3 or 6.3 respectively. The outputs of the speed ratio transmission sections 8, 9 are in each case rotationally fixedly connected to the output interface 14 (AB).

Furthermore, the transmission arrangement 1 has a coupling brake device BE which is rotationally fixedly connected to the second input interface 3 and which allows the second input interface 3 to be blocked or braked.

In the transmission arrangement 1 as per FIG. 1, the planetary transmission sections 5, 6 are, by way of the sun gears 5.2 and 6.2, coupled via the coupling section 10 by means of the transmission section 7 with the speed ratio of $i=-1$, such that, during operation in which both speed ratio transmission sections 8, 9 drive the output interface 14, the planetary transmission sections 5, 6 are supported on one another via the coupling section 10. Alternatively, the support may also be realized by means of other transmission variants as a coupling section, for example by virtue of the connection of the planetary transmission sections 5, 6 to the first input interface 2 being realized by means of speed ratios with different signs, together with a different sign of the speed ratio between the planetary transmission sections 5, 6 and the output interface 14.

In particular, the transmission arrangement 1 has a transmission input shaft AN, which forms the first input interface 2, and a transmission output shaft AB, which forms the output interface 14, two speed ratio transmission sections 8, 9, which form two sub-transmissions with in each case one or more gear ratios, the electric motor 4, the coupling brake device BE, two planetary transmission sections 5, 6, and the coupling section 10 between the planetary transmission sections 5, 6.

An exemplary embodiment of the transmission arrangement 1 has a fixed-carrier speed ratio of the planetary transmission sections 5, 6 of $i=-2.5$, two transmission stages for the first speed ratio transmission section with $i1=-2.3$ and $i3=-0.7$, and two speed ratio stages for the second speed ratio transmission section 9 with $i2=-1.1$; $i4=-0.51$. The transmission arrangement 1 optionally additionally has a final drive speed ratio, in particular at a differential device (not illustrated), with $iD=-3$. The final drive speed ratio is connected downstream of the output interface 14.

Possible operating modes of the transmission arrangement 1 and of the resulting speed ratios are presented in the following table:

| Gear ratio | $i_{AN->AB}$ | $i_{EM->AB}$ | BE | iU | iG |
|---|---|---|---|---|---|
| G1 => I1 | 9.66 | Blocked | Active | −2.3 | N |
| V1 | 9.66 | 24.15 | — | −2.3 | N |
| G2 => I1 + I2 | 7.14 | 6.3 | — | −2.3 | −1.1 |
| V2 | 4.62 | −11.6 | — | N | −1.1 |
| G3 => I2 | 4.62 | Blocked | Active | N | −1.1 |
| V2 | 4.62 | −11.6 | — | N | −1.1 |
| G4 => I2 + I3 | 3.78 | −2.1 | — | −0.7 | −1.1 |
| V3 | 2.94 | 7.35 | — | −0.7 | N |
| G5 => I3 | 2.94 | Blocked | Active | −0.7 | N |
| V3 | 2.94 | 7.35 | — | −0.7 | N |
| G6 => I3 + I4 | 2.54 | 1 | — | −0.7 | −0.51 |
| V4 | 2.14 | −5.36 | — | N | −0.51 |
| G7 => I4 | 2.14 | Blocked | Active | N | −0.51 |

Brief Description of the Operating Modes:

G1, G3, G5, G7: Operating modes with fixed rotational speed ratios. In each case only one speed ratio transmission section (8 or 9) has an engaged gear ratio and is involved in the transmission of torque.

G2, G4, G6: Operating modes with fixed rotational speed ratios. Both speed ratio transmission sections (8 and 9) simultaneously have an engaged gear ratio and are involved in the transmission of torque. The resulting speed ratio lies between G1 and G3. The rotational speed of the coupled sun gears 5.2, 6.2 is set of its own accord such that, despite different rotational speeds at the planetary transmission sections 5, 6, the internal gears 5.1, 6.1 rotate at equal speed with the rotational speed of the first input interface 2.

Operating modes V1, V2, V3 and V4: These are each driving modes in which the rotational speed of the electric motor 4 and of the internal combustion engine (not illustrated) are superposed (or added) in one of the planetary transmission sections 5, 6. Thus, in the case of constant rotational speed of the internal combustion engine, the output rotational speed can be varied by means of the rotational speed of the electric motor. This makes it possible for the output interface to be static when a gear ratio is engaged and the internal combustion engine is rotating.

In the above table, the speed ratios $I_{VM \rightarrow Ab}$ and $I_{EM \rightarrow AB}$ relate to the speed ratios of the torques:

$$AB_{torque} = AN_{torque} * i_{VM \rightarrow Ab}$$

Figure 2A:
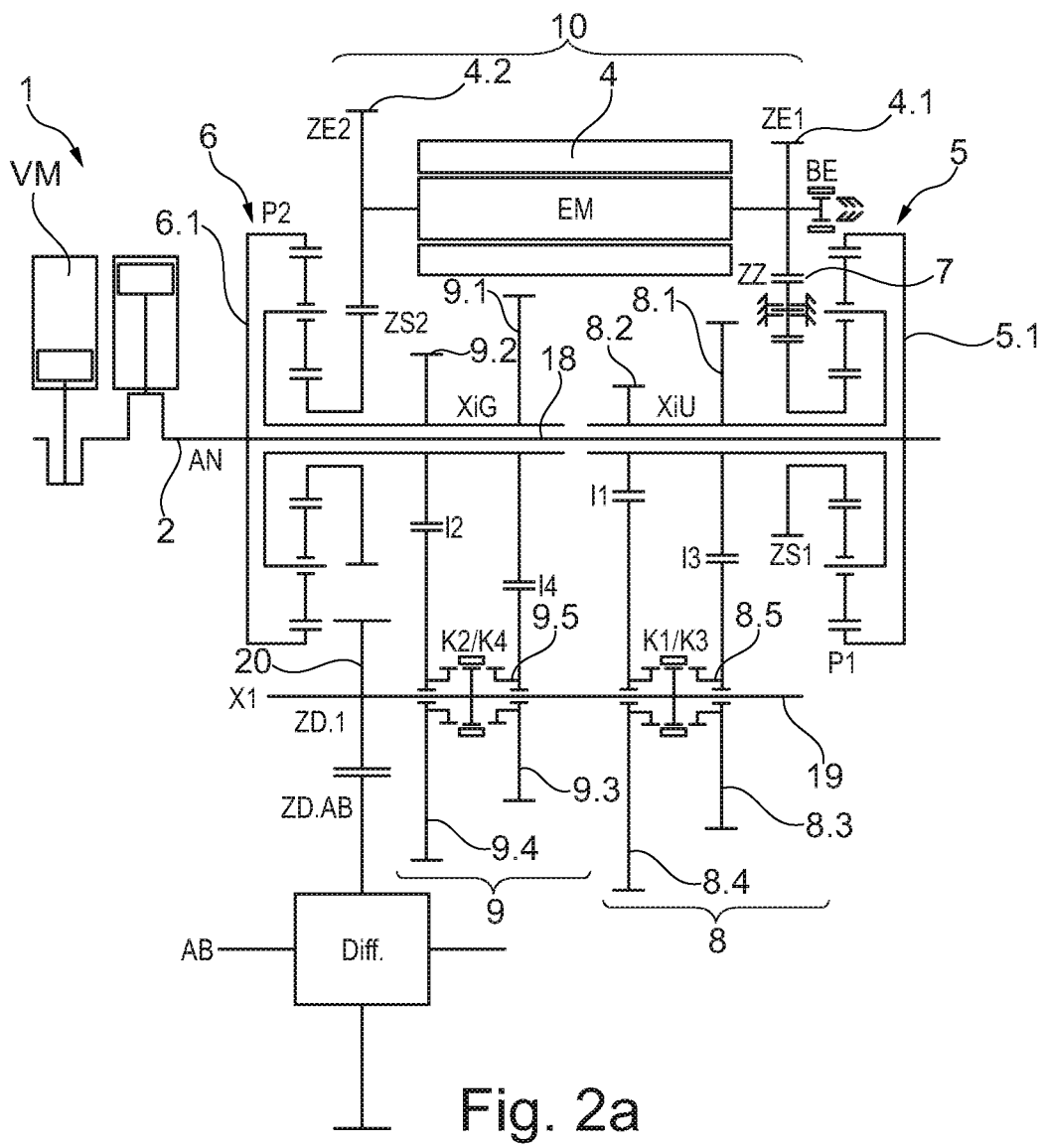
FIGS. 2a and 2b show a design embodiment of a transmission arrangement with an additional axial plan view of the transmission arrangement.

FIG. 2a shows, in a schematic illustration, a first physical implementation of the transmission arrangement 1 in FIG. 1. Here, same parts are denoted in each case by the same reference designations. The transmission arrangement 1 in FIG. 2a has a common input shaft 18, which is operatively connected and in particular rotationally fixedly coupled to the first input interface 2. The first input interface 2 is operatively connected to the internal combustion engine VM. Arranged coaxially with respect to the common input shaft 18 are the first planetary transmission section 5, the second planetary transmission section 6, the first speed ratio transmission section 8 and the second speed ratio transmission section 9. Here, the planetary transmission sections 5, 6 engage in a bracket-like manner around the speed ratio transmission sections 8, 9 in an axial direction. Accordingly, the first planetary transmission section 5 is arranged on an axial side of the transmission arrangement 1 which is averted from the internal combustion engine VM and/or from the first input interface 2. In the direction of the first input interface 2, there then follows the first speed ratio transmission section 8, the second speed ratio transmission section 9 and the second planetary transmission section 6. The common input shaft 18 is rotationally fixedly connected to the first internal gear 5.1 of the first planetary transmission section 5 and to the second internal gear 6.1 of the second planetary transmission section 6.

The speed ratio transmission sections 8, 9 each have input gears 8.1, 8.2, 9.1, 9.2, which are arranged coaxially with respect to the common input shaft 18 and can rotate relative thereto. By contrast, the output gears of the speed ratio transmission sections 8, 9, specifically 8.3, 8.4, 9.3, 9.4, are rotatably mounted on a common output shaft 19.

Figure 2B:
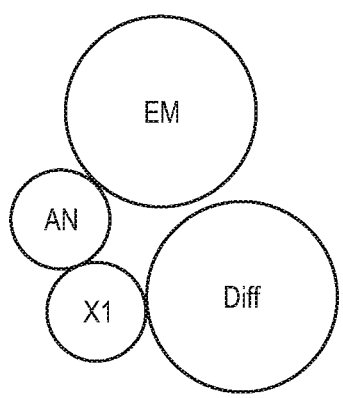

In FIG. 2b, which shows an axial plan view of the transmission arrangement 1, the common input shaft 18 is denoted by AN, and the common output shaft 19 is denoted by X1. The speed ratio transmission sections 8, 9 have in each case one shift actuator arrangement 8.5, 9.5, which permit a selective coupling of the output gears 8.3, 8.4 or 9.3, 9.4 respectively to the common output shaft 19. By contrast, the input gears 8.1, 8.2 are rotationally fixedly coupled to the first planet carrier 5.3, and by contrast, the input gears 9.1, 9.2 are rotationally fixedly coupled to the second planet carrier 6.3.

On the common output shaft 19, there is seated a drive-output gear 20, which meshes with a differential device 21.

The electric motor 4 defines a rotor shaft which is arranged parallel to the common input shaft 18, to the common output shaft 19 and to the differential device 21. The electric motor 4 is coupled to two electric motor drive-output gears 4.1, 4.2. The electric motor drive-output gear 4.1 is operatively connected by means of the transmission section 7 to the first sun gear 5.2, whereas the other electric motor drive-output gear 4.2 is directly operatively connected to the second sun gear 6.2, thus realizing, overall, the coupling section 10. The transmission arrangement 1 corresponds to a dual-clutch transmission, the two sub-transmissions of which are connected to a drive not rigidly but rather by means of the planetary transmission sections, such that, in addition to the normal speed ratios of the sub-transmissions, the speed ratios of the two sub-transmissions can be mixed. The result is therefore a considerably greater number of speed ratios than the spur-gear stages might suggest at first glance. The connection of the integrated electric motor 4 is selected such that it permits a smooth transition between different gear ratios without an interruption in traction power.

Various speed ratios of the transmission arrangement 1 as per FIG. 2a are presented in the following table.

| Mode | $I_{AN \rightarrow AB}$ | $i_{EM \rightarrow AB}$ | BE | IU | iG |
|---|---|---|---|---|---|
| G1 => I1 | 9.66 | Blocked | Active | −2.3 | N |
| V1 | 9.66 | 24.15 | — | −2.3 | N |
| G2 => I1 + I2 | 7.14 | 6.3 | — | −2.3 | −1.1 |
| V2 | 4.62 | −11.6 | — | N | −1.1 |
| G3 => I2 | 4.62 | Blocked | Active | N | −1.1 |
| V2 | 4.62 | −11.6 | — | N | −1.1 |
| G4 => I2 + I3 | 3.78 | −2.1 | — | −0.7 | −1.1 |
| V3 | 2.94 | 7.35 | — | −0.7 | N |
| G5 => I3 | 2.94 | Blocked | Active | −0.7 | N |
| V3 | 2.94 | 7.35 | — | −0.7 | N |
| G6 => I3 + I4 | 2.54 | 1 | — | −0.7 | −0.51 |
| V4 | 2.14 | −5.36 | — | N | −0.51 |
| G7 => I4 | 2.14 | Blocked | Active | N | −0.51 |

Fixed-carrier speed ratio of the planetary gear sets: −2.5
Speed ratios of the spur-gear stages: I1=−2.3; I2=−1.1; I3=−0.7; I4=−0.51
Final drive speed ratio at the differential: ID=−3
Column 2: Torque ratio between the shafts AN and AB.

$$\text{Torque}_{AB} = i_{AN \rightarrow AB} * \text{torque}_{AN}$$

Column 3: Torque ratio between EM and AB.

$$\text{Torque}_{AB} = i_{EM \rightarrow AB} * \text{torque}_{EM}$$

Column 4: Speed ratio between the shafts XiU and X1.
Column 5: Speed ratio between the shafts XiG and X1.

The transmission arrangement 1 corresponds in particular to a hybrid transmission with 7 gear ratios.

Figure 3A:
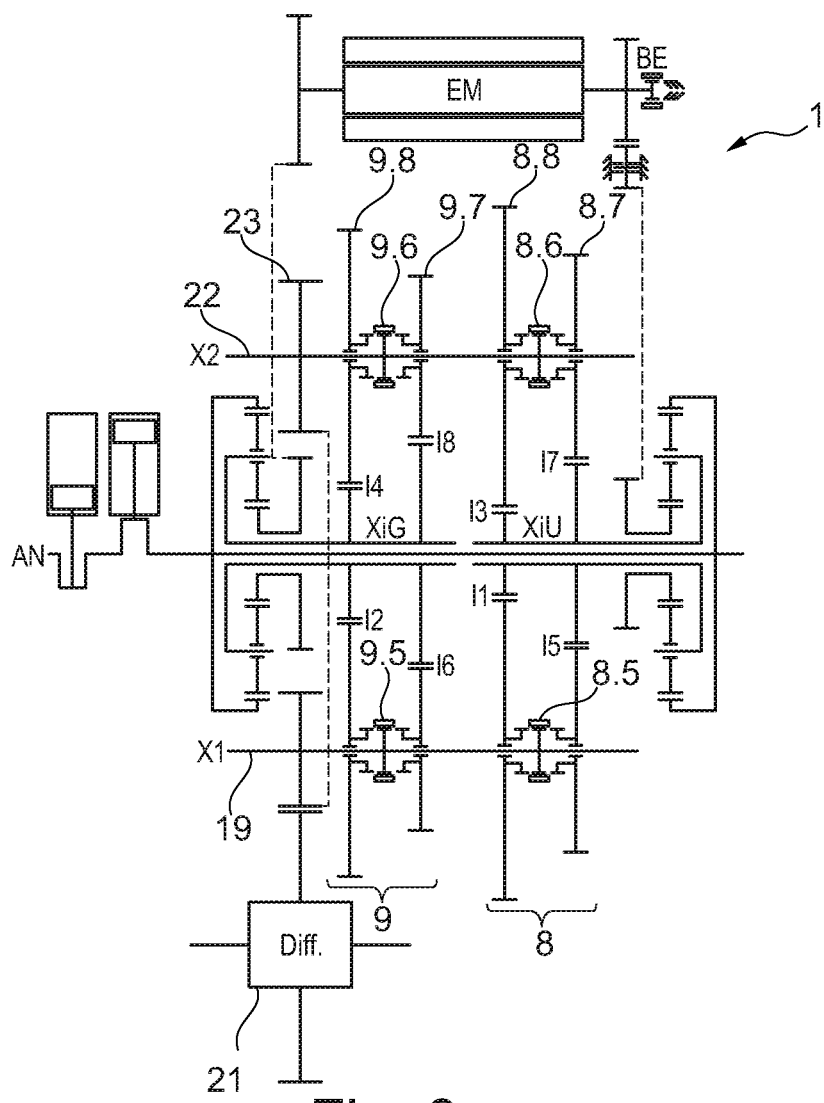
FIGS. 3a and 3b show a further design embodiment of a transmission arrangement with an additional axial plan view of the transmission arrangement.

FIG. 3a shows a further transmission arrangement 1 as an exemplary embodiment. This involves a hybrid transmission with 15 gear ratios and with an electric motor. In terms of structure and function, the transmission arrangement 1 in FIG. 3a corresponds to the diagram in FIG. 1. However, each of the speed ratio transmission sections 8, 9 has four possible speed ratio stages, which can be selectively engaged by means of four shift devices 8.5, 8.6, 9.5, 9.6.

Figure 3B:
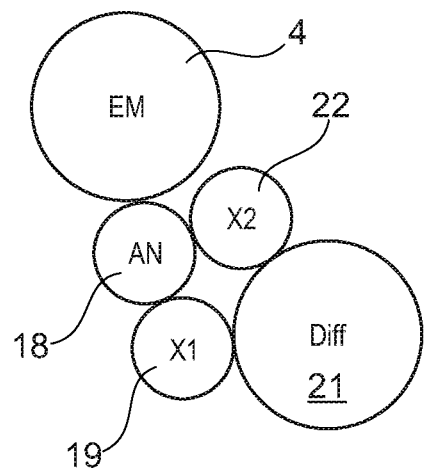

In addition to the common first output shaft 19, the transmission arrangement 1 in FIGS. 3a and 3b has a second common output shaft 22. For each speed ratio transmission section 8, 9, in each case two output gears 8.7, 8.8 and 9.7, 9.8 respectively are seated on the second common output shaft 22. A second drive-output gear 23 meshes with the differential device 21. FIG. 3b illustrates, in an axial plan view, the location and the position of the shafts of the differential device 21, of the common input shaft 18, of the first common output shaft 19 and of the second common output shaft 22 and also of the electric motor 4.

Figure 4:
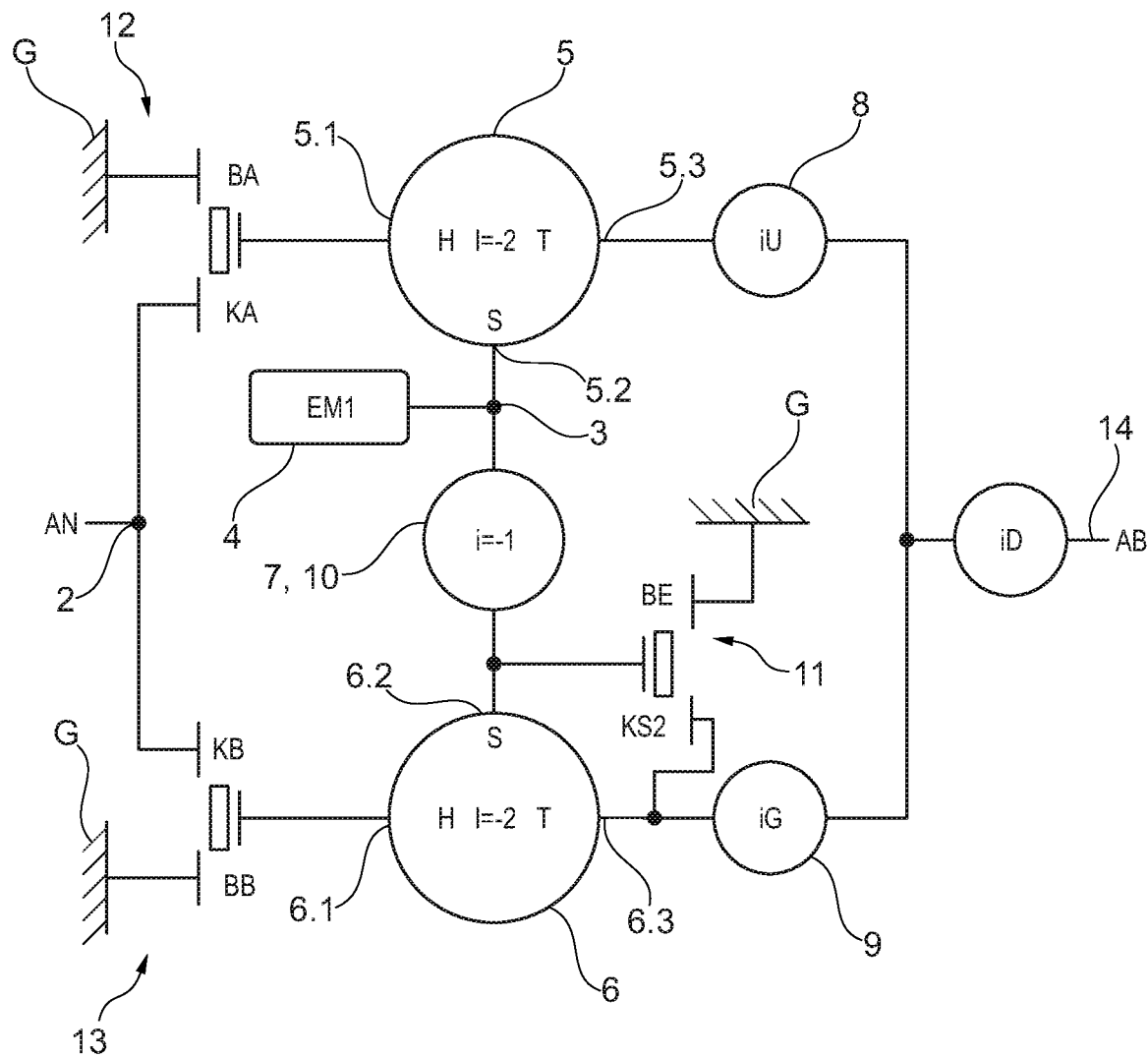
FIG. 4 shows a further schematic illustration of a transmission arrangement as an exemplary embodiment of the disclosure.

FIG. 4 shows a further schematic illustration of a further transmission arrangement 1. FIG. 2 shows, in a similar illustration to FIG. 1, a transmission arrangement 1, which differs from the transmission arrangement 1 in FIG. 1 firstly by the position of the coupling brake device BE and secondly by further components. Similarly to the situation in FIG. 1, however, the transmission arrangement 1 comprises the first input interface 2, the second input interface 3, the electric motor 4, the output interface 14, the first and second planetary transmission section 5, 6 and the first and second speed ratio transmission section 8, 9. In this exemplary embodiment, too, the sun gears 5.2, 6.2 are connected to one another by means of a coupling section 10, which comprises the transmission section 7. However, the coupling brake device BE forms a part of an output-side coupling actuator apparatus 11, which has two inputs. A first input is rotationally fixedly connected to the sun gear 6.2, and a second input is rotationally fixedly connected to the planet carrier 6.3. The output-side coupling actuator apparatus 11 makes it possible, in a shift position BE, for the sun gear 6.2 to be rotationally fixed with respect to a frame, in particular a housing of the transmission arrangement 1. In a shift position KS2, the sun gear 6.2 and the planet carrier 6.3 are rotationally fixed to one another. The output-side coupling actuator apparatus 11 may, like all other devices of the transmission arrangement 1, be actuated by means of a control device (not illustrated). It is furthermore possible for the output-side coupling actuator apparatus 11 to be set into a neutral state N. In this case, the inputs are rotationally decoupled with respect to one another and with respect to the frame G. The shift position KS2 permits blocking of the planetary transmission section 6, such that the internal gear 6.1, sun gear 6.2 and planet carrier 6.3 can rotate synchronously with one another. BE serves for the blocking of the coupled inputs of the two planetary transmission sections 5, 6 against rotation, and thus forms the coupling brake device. KS2 is combined with the locking means BE as one shift element. If only one of the planetary transmission sections 5, 6 is designed to be lockable, as illustrated in FIG. 2, then it is particularly advantageous if the lockable planetary transmission section 6 is situated upstream of the speed ratio transmission section 8, 9 with the fastest speed ratio, such that an economy gear ratio using the locking of the planetary transmission section 6 once again permits a considerably faster speed ratio. It is furthermore advantageous if the lockable planetary transmission section 6 is not situated upstream of the sub-transmission with the slowest speed ratio, because this simplifies the realization of a creep gear ratio.

The transmission arrangement 1 furthermore has two input actuator apparatuses 12, 13. The input actuator apparatuses 12, 13 are arranged in each case between the first input interface 2 and the first shaft, in this case the internal gear 5.1 and 6.1 of the planetary transmission sections 5, 6. The input actuator apparatuses 12, 13 make it possible for the respective internal gear 5.1, 6.1 to be selectively rotationally fixed to the first input interface 2 or to the frame G. In the case of the input actuator apparatuses 12, 13, too, a neutral position N is possible.

The shift positions KA and KB permit a connection between the internal gears 5.1 and 6.1 of the planetary transmission sections 5, 6 and the first input interface 2. BA and BB permit blocking of the corresponding internal gear 5.1, 6.1 against rotation.

Exemplary speed ratios are:

fixed-carrier speed ratio of the planetary transmission sections 5, 6: i=−2.5; speed ratios of the spur-gear stages of the first speed ratio transmission section 5: i1=−2.3; i3=−0.7 and of the second speed ratio transmission section 6: i2=−1.1; i4=−0.51. Final drive speed ratio at the differential: iD=−3.

The various operating modes are specified in the following table.

|  | Mode | Comment | $i_{AN \to AB}$ | $i_{EM \to AB}$ | KA/BA | KB/BB | BE/KS2 | iU | iG |
|---|---|---|---|---|---|---|---|---|---|
| Fixed speed ratios | G1 | iU = I1 + creep | 16.1 | −16.1 | KA | KB | KS2 | −2.3 | N |
|  | G2 | iU = I1 | 9.66 | Blocked | KA | KB | BE | −2.3 | N |
|  | G3 | iU = I1 + iG = I2 | 7.14 | 6.3 | KA | KB | N | −2.3 | −1.1 |
|  | G4 | iG = I2 | 4.62 | Blocked | KA | KB | BE | N | −1.1 |
|  | G5 | iU = I3 + IG = I2 | 3.78 | −2.1 | KA | KB | N | −0.7 | −1.1 |
|  | G6 | iU = I3 | 2.94 | Blocked | KA | KB | BE | −0.7 | N |
|  | G7 | iU = I3 + iG = I4 | 2.54 | 1 | KA | KB | N | −0.7 | −0.5 |
|  | G8 | iG = I4 | 2.14 | Blocked | KA | KB | BE | N | −0.5 |
|  | G9 | iG = I4 + economy | 1.53 | −1.53 | KA | KB | KS2 | N | −0.5 |
| Electric driving | E1 | Electric forward | Idle | −11.6 | KA | BB | N | N | −1.1 |
|  | E1H | E1 auxiliary gear ratio | 14.28 | −11.6 | KA | BB | N | −2.3 | −1.1 |
|  | E1V1 | V1 proceeding from E1H | 9.66 | 24.15 | KA | N | N | −2.3 | −1.1 |
|  | E1G1 | G1 proceeding from E1V1 | 9.66 | Blocked | KA | N | BE | −2.3 | −1.1 |
|  | E1V1 | V1 proceeding from E1G1 | 9.66 | 24.15 | KA | N | N | −2.3 | −1.1 |
| R | ER | Electric reverse | Idle | 24.15 | BA | N | KS2 | −2.3 | N |
|  | R | Reverse | −24.15 | −24.15 | BA | KB | KS2 | −2.3 | N |
| Variable | V1 | iU = I1 | 9.66 | 24.15 | KA | KB | N | −2.3 | N |
|  | V2 | iG = I2 | 4.62 | −11.6 | KA | KB | N | N | −1.1 |
|  | V3 | iU = I3 | 2.94 | 7.35 | KA | KB | N | −0.7 | N |
|  | V4 | iG = I4 | 2.14 | −5.36 | KA | KB | N | N | −0.5 |
|  | L | Charging gear ratio | Idle | Idle | N | KB | KS2 | N | N |

The fixed gear ratios G2-G8 correspond to the fixed gear ratios G1-G7 from FIG. 1. The operating modes V1-V4 are similar to those in FIG. 1; the additional shift elements KA/BA, KB/BB and KS2 permit 2 new gear ratios (G1=>I1+creep and G9=>I4+economy), and a reverse gear ratio, and also electric driving (forward and reverse). For electric forward driving and a change to hybrid operation without an interruption in traction power and without special synchronizing rings on the individual shift sleeves, further shift combinations are listed.

Figure 5:
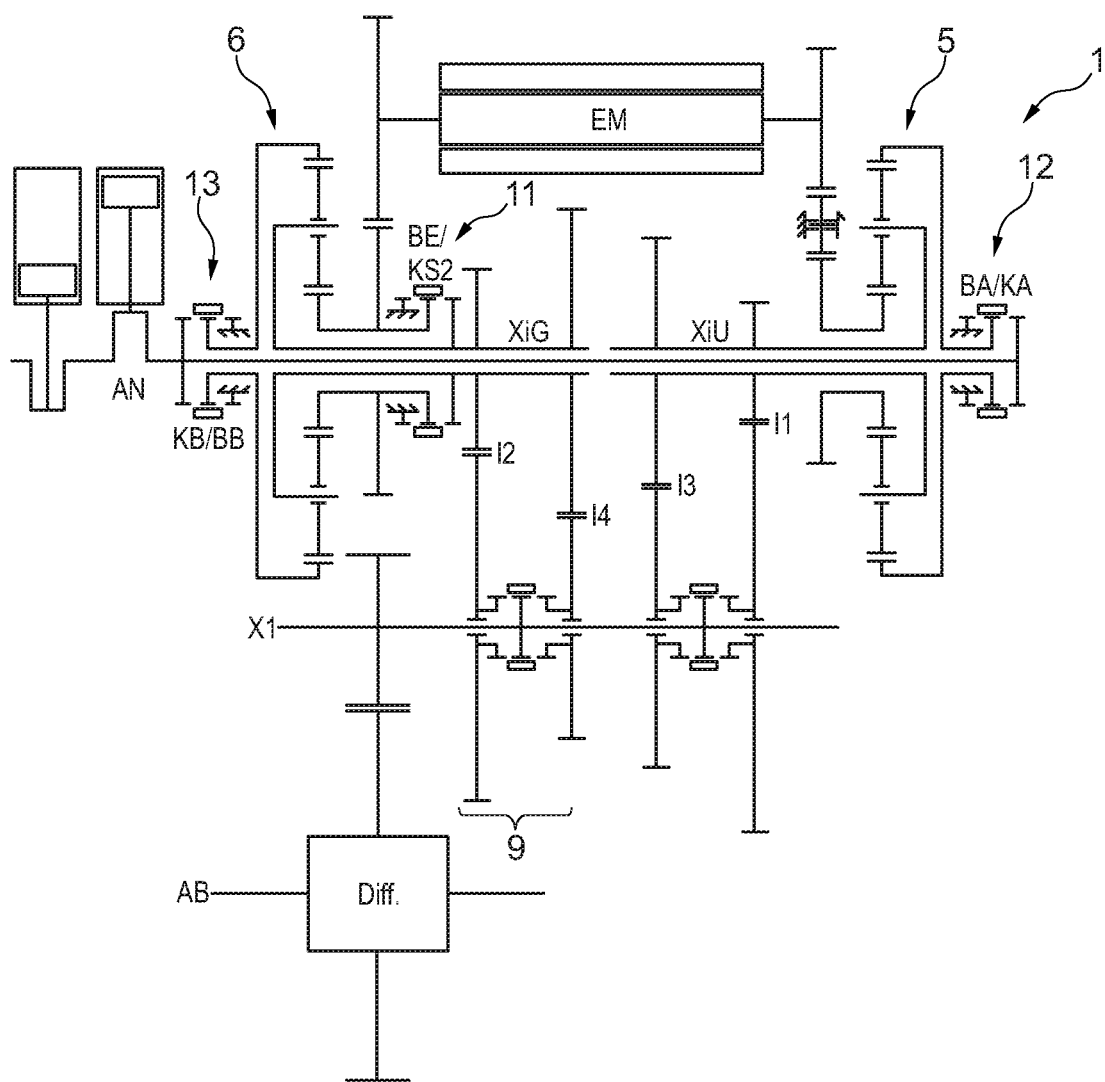
FIG. 5 shows a further design embodiment of a transmission arrangement.

FIG. 5 shows an exemplary embodiment of the transmission arrangement 1 in FIG. 4. The output-side coupling actuator apparatus 11 is arranged between the second speed ratio transmission section 9 and the second planetary transmission section 6. The input actuator apparatuses 12, 13 are arranged in each case axially at the outside in relation to the planetary transmission sections 5, 6.

The output-side coupling actuator apparatus 11 and the input actuator apparatuses 12, 13 permit additional operating modes such as for example a reverse gear ratio, purely electric driving and a smooth transition to hybrid drive and drive purely by internal combustion engine, a creep gear ratio (slower than with i1 alone), and an economy gear ratio (faster than i4 alone). The actuator apparatuses 11, 12, 13 shown may also be combined with the exemplary embodiment as per FIG. 4 or 5. The operating modes are listed in the following table.

4 speed ratios (V1 to V4) of variable rotational speed, in which the rotational speeds of the internal combustion engine and of the electric machine are superposed.

An operating mode (L) with exclusive coupling between the internal combustion engine and the electric machine for the purposes of starting the VM or charging the battery.

Figure 6:
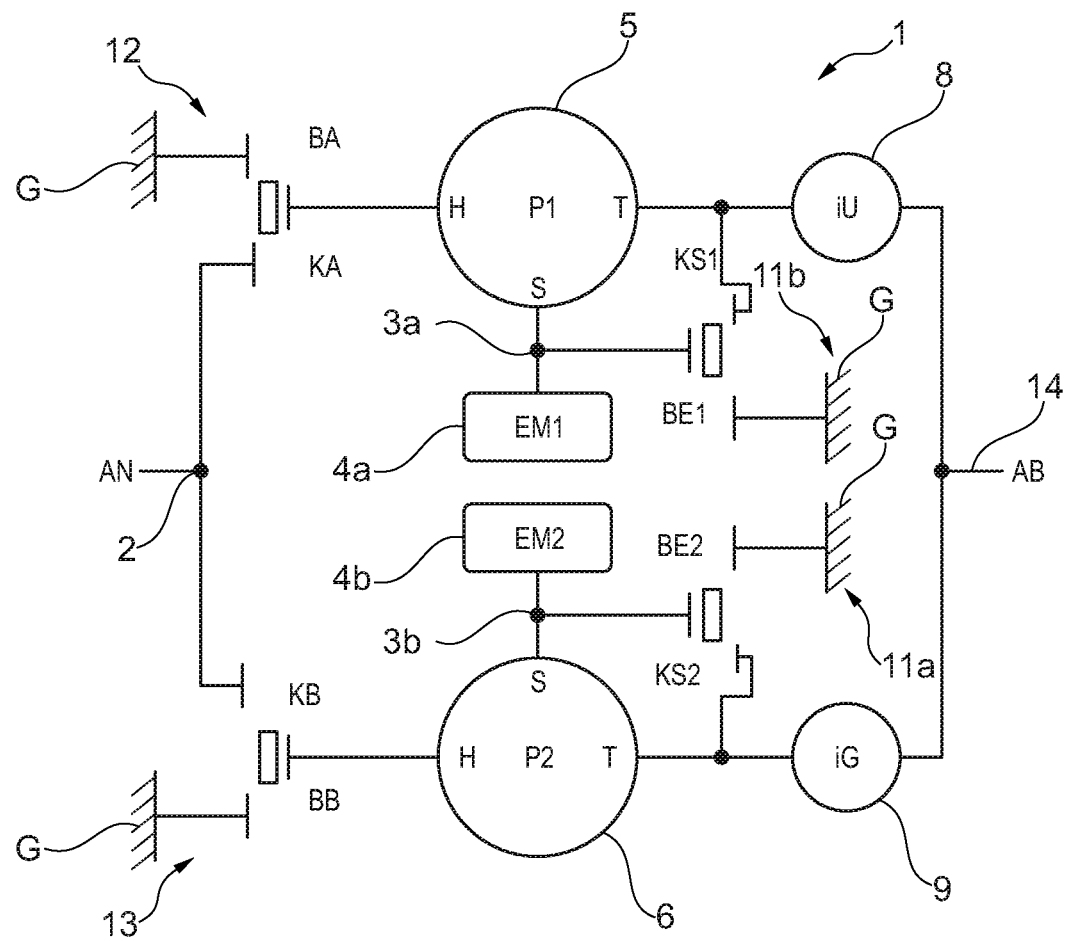
FIG. 6 shows a further schematic illustration of a transmission arrangement as an exemplary embodiment of the disclosure.

FIG. 6 is a schematic illustration of a further transmission arrangement. The further transmission arrangement has the input actuator apparatuses 12, 13 as in FIG. 4. By contrast to FIG. 4, the coupling section 10 with the electric motor 4 is however of different design. In the implementation in FIG. 6, two electric motors 4a and 4b are provided, which can be actuated independently of one another. Furthermore, the transmission arrangement 1 has two output-side coupling actuator apparatuses 11a and 11b, as in FIG. 4. In the exemplary embodiment 6, the coupling by means of the

|  | Mode | Comment | $i_{AN \to AB}$ | $i_{EM \to AB}$ | KA/BA | KB/BB | BE/KS2 | iU | iG |
|---|---|---|---|---|---|---|---|---|---|
| Fixed speed ratios | G1 | iU = I1 + creep | 16.1 | −16.1 | KA | KB | KS2 | −2.3 | N |
|  | G2 | iU = I1 | 9.66 | Blocked | KA | KB | BE | −2.3 | N |
|  | G3 | iU = I1 + iG = I2 | 7.14 | 6.3 | KA | KB | N | −2.3 | −1.1 |
|  | G4 | iG = I2 | 4.62 | Blocked | KA | KB | BE | N | −1.1 |
|  | G5 | iU = I3 + IG = I2 | 3.78 | −2.1 | KA | KB | N | −0.7 | −1.1 |
|  | G6 | iU = I3 | 2.94 | Blocked | KA | KB | BE | −0.7 | N |
|  | G7 | iU = I3 + iG = I4 | 2.54 | 1 | KA | KB | N | −0.7 | −0.5 |
|  | G8 | iG = I4 | 2.14 | Blocked | KA | KB | BE | N | −0.5 |
|  | G9 | iG = I4 + economy | 1.53 | −1.53 | KA | KB | KS2 | N | −0.5 |
| Electric driving | E1 | Electric forward | Idle | −11.6 | KA | BB | N | N | −1.1 |
|  | E1H | E1 auxiliary gear ratio | 14.28 | −11.6 | KA | BB | N | −2.3 | −1.1 |
|  | E1V1 | V1 proceeding from E1H | 9.66 | 24.15 | KA | N | N | −2.3 | −1.1 |
|  | E1G1 | G1 proceeding from E1V1 | 9.66 | Blocked | KA | N | BE | −2.3 | −1.1 |
|  | E1V1 | V1 proceeding from E1G1 | 9.66 | 24.15 | KA | N | N | −2.3 | −1.1 |
| R | ER | Electric reverse | Idle | 24.15 | BA | N | KS2 | −2.3 | N |
|  | R | Reverse | −24.15 | −24.15 | BA | KB | KS2 | −2.3 | N |
| Variable | V1 | iU = I1 | 9.66 | 24.15 | KA | KB | N | −2.3 | N |
|  | V2 | iG = I2 | 4.62 | −11.6 | KA | KB | N | N | −1.1 |
|  | V3 | iU = I3 | 2.94 | 7.35 | KA | KB | N | −0.7 | N |
|  | V4 | iG = I4 | 2.14 | −5.36 | KA | KB | N | N | −0.5 |
|  | L | Charging gear ratio | Idle | Idle | N | KB | KS2 | N | N |

The gear ratios and the shift states in the table have been selected such that the transitions from one operating mode to the next can be realized in each case as single shifts (only one shift device is changed). All shafts are always at defined rotational speeds, such that separate synchronizing devices in the case of positively locking shift apparatuses can be omitted:

The change between the gear ratios G1 to G9 is performed with the aid of the variable gear ratios V1 to V4.
G1↔V1↔G2↔V1↔G3↔V2↔G4↔V2↔G5↔V3↔G6↔V3↔G7↔V4↔G8↔V4↔G9

Electric launching and the transition to driving operation by means of the internal combustion engine is performed using an auxiliary gear ratio and modified shift combinations of further gear ratios:
Electric forward←Electric auxiliary gear ratio 1←V1←G2←V1←G3 (wherein V1, G2 use slightly modified shift combinations).
Electric forward←Electric auxiliary gear ratio 2←V3←G6←V3←G7 (wherein V3, G6 use slightly modified shift combinations).
Electric reverse driving. By closing KB, a shift can be performed into the fixed reverse gear ratio.
The transmission may have the following gear ratios:
9 forward gear ratios with fixed speed ratios (G1 to G9)
One reverse gear ratio with fixed speed ratio (R)
Electric launching.
Electric reverse driving.

coupling section 10 is realized virtually, that is to say by means of the actuation of the electric motors 4a, b.

Figure 7A:
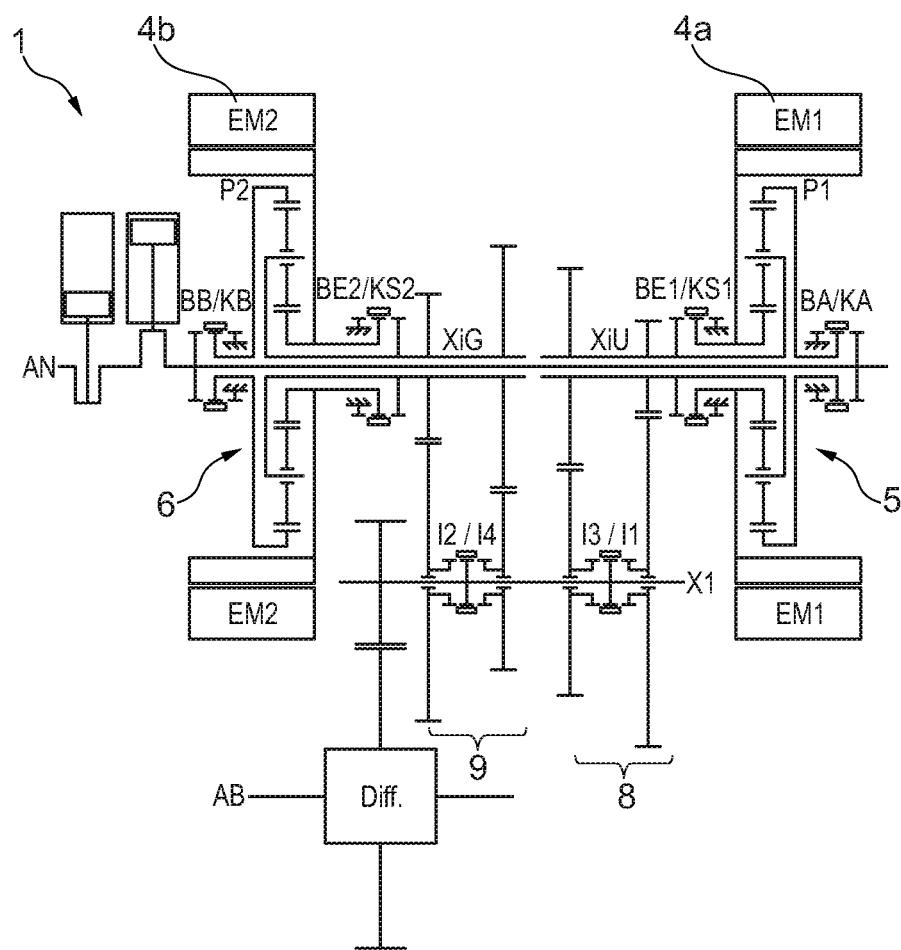
FIGS. 7a and 7b show a further design embodiment of a transmission arrangement with an additional axial plan view of the transmission arrangement.
Figure 7B:
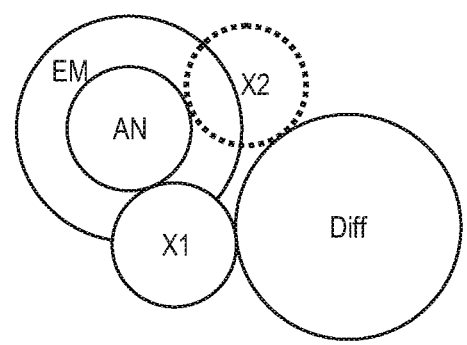

FIGS. 7a and 7b show one possible physical embodiment of the transmission arrangement in FIG. 6. Whereas it is the case in the implementation of the transmission arrangement in FIG. 4 or in the earlier figures that the speed ratio transmission sections 8, 9 are situated in an axial region which is also accommodated in the electric motor 4, that is to say are arranged in the rotor space, the electric motors 4a and 4b are arranged coaxially with respect to the planetary transmission sections 5, 6 in the embodiment as per FIG. 7a.

Figure 8:
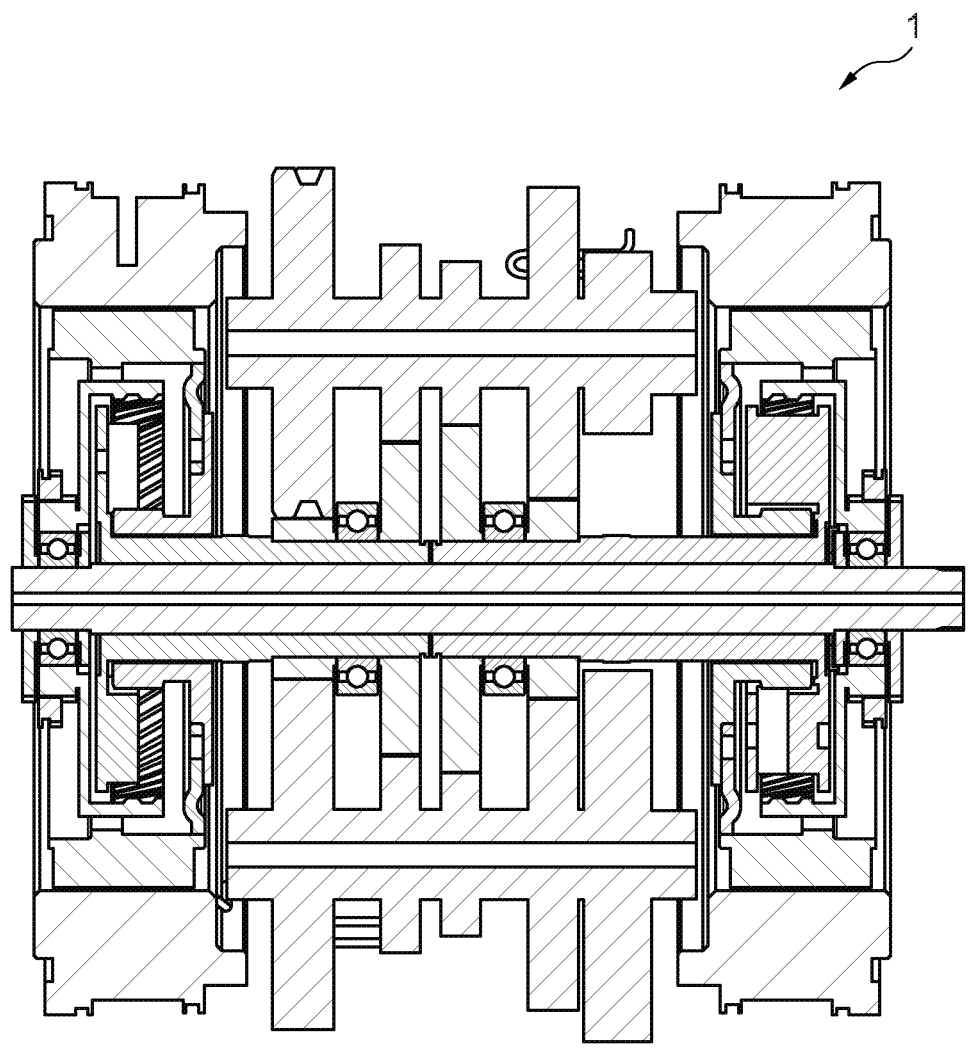
FIG. 8 shows a design embodiment of a transmission arrangement in a sectional illustration.
Figure 9:
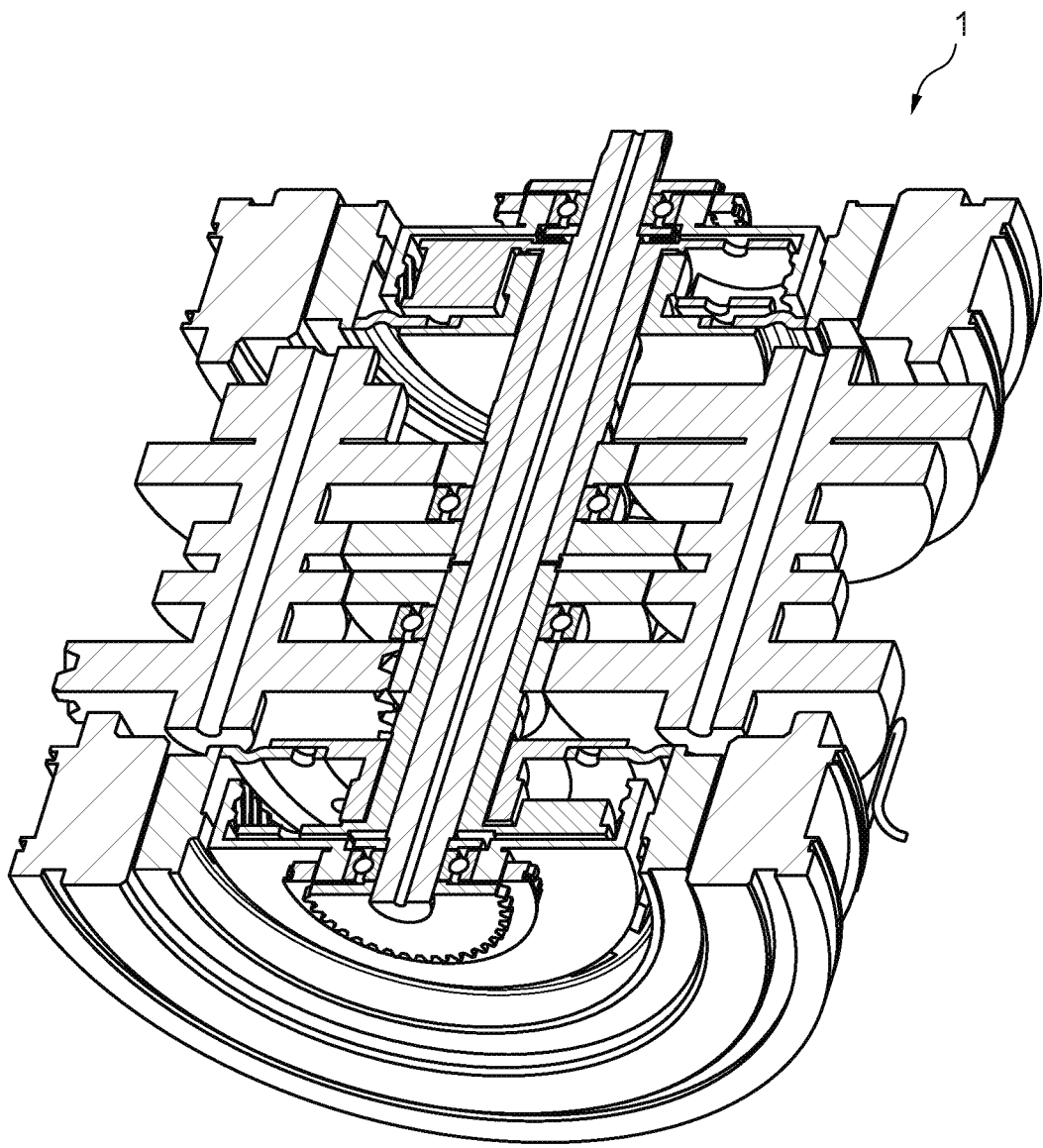
FIG. 9 shows a further design embodiment of a transmission arrangement in a sectional illustration.

FIGS. 8 and 9 show illustrations of possible design embodiments of the transmission arrangement 1.

Figure 10A:
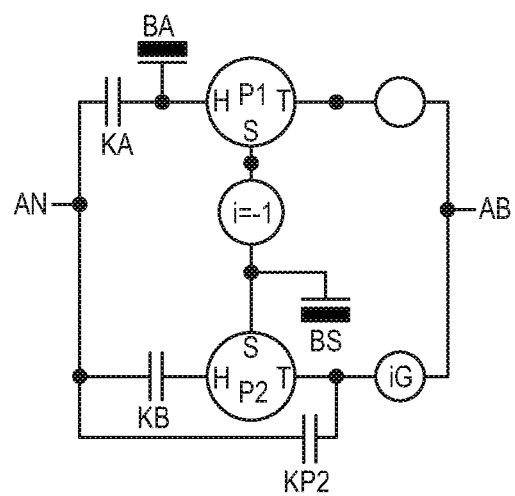
FIGS. 10a and 10b show a further schematic embodiment of a transmission arrangement and the physical implementation thereof.
Figure 10B:
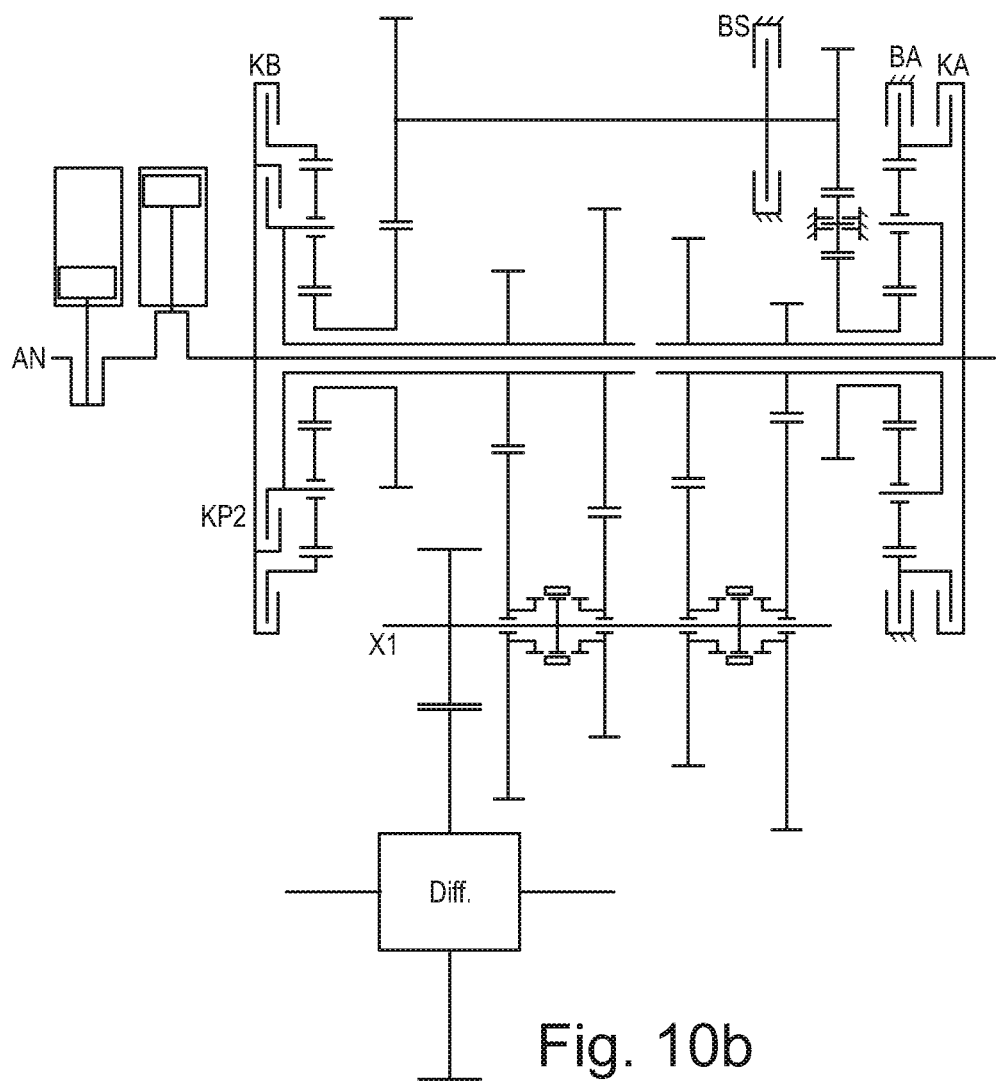

FIGS. 10a and 10b finally show an embodiment of a transmission arrangement 1 as a modification of the transmission arrangement 1 in the preceding figures, but without an electric motor. Owing to the absence of an electric machine, the shift elements K1/K3 and K2/K4 must be designed with synchronization rings. KB and KP2 may be combined in one structural unit, similarly to a current dual clutch. Three alternative launch clutches (KA, KB, KP2) make it possible for the wear and the introduction of power (e.g. in the case of multiple launch events on a gradient) to be distributed between different clutch elements, for example by virtue of a different clutch being used for every launch process.

Operating modes and shift states in the case of an embodiment without EM:

|  | Mode | Comment | $i_{AN \to AB}$ | KA/BA | KB | BE/KP2 | iU | iG |
|---|---|---|---|---|---|---|---|---|
| Forward gear ratios | G1 | iU = I1 + creep | 16.1 | KA | KB | KP2 | −2.3 | N |
|  | G2 | iU = I1 | 9.66 | KA | N | BE | −2.3 | N |
|  | G3 | iU = I1 + iG = I2 | 7.14 | KA | KB | N | −2.3 | −1.1 |
|  | G4 | iG = I2 | 4.62 | N | KB | BE | N | −1.1 |
|  | G5 | iU = I3 + IG = I2 | 3.78 | KA | KB | N | −0.7 | −1.1 |
|  | G6 | iU = I3 | 2.94 | KA | N | BE | −0.7 | N |
|  | G7 | iU = I3 + iG = I4 | 2.54 | KA | KB | N | −0.7 | −0.5 |
|  | G8 | iG = I4 | 2.14 | N | KB | BE | N | −0.5 |
|  | G9 | iG = I4 + economy | 1.53 | N | KB | KP2 | N | −0.5 |
| R | R | Reverse | −24.15 | BA | KB | KP2 | −2.3 | N |

LIST OF REFERENCE NUMERALS

1 Transmission arrangement
2 First input interface
3, 3a, 3b Interfaces
4 Electric motor
4a, 4b Electric motors
4.1 Electric motor drive-output gear
4.2 Electric motor drive-output gear
5 First planetary transmission section
5.1 First internal gear
5.2 First sun gear
5.3 First planet carrier
6 Second planetary transmission section
6.1 Second internal gear
6.2 Second sun gear
6.3 Second planet carrier
7 Transmission section
8 First speed ratio transmission section
8.1 Input gear
8.2 Input gear
8.3 Output gear
8.4 Output gear
8.5 Shift actuator arrangement
8.5/8.6 Shift device
8.7 Output gear
8.8 Output gear
9 Second speed ratio transmission section
9.1 Input gear
9.2 Input gear
9.3 Output gear
9.4 Output gear
9.5 Shift actuator arrangement
9.6 Shift device
9.7 Output gear
9.8 Output gear
10 Coupling section
11 Coupling actuator apparatus
11a Coupling actuator apparatus
11b Coupling actuator apparatus
12 Input actuator apparatus
13 Input actuator apparatus
18 Common input shaft
19 First common output shaft
20 1st drive-output gear
21 Differential device
22 Second common output shaft
23 Second drive-output gear
VM Internal combustion engine

The invention claimed is:

1. A transmission for a vehicle comprising:
a first input interface arranged for coupling to an internal combustion engine;
an output interface;
a first speed ratio transmission section comprising:
 a first speed ratio transmission section input;
 a first speed ratio transmission section output operatively connected to the output interface; and,
 at least one first speed ratio stage;
a second speed ratio transmission section comprising:
 a second speed ratio transmission section input;
 a second speed ratio transmission section output operatively connected to the output interface; and,
 at least one second speed ratio stage;
a first planetary transmission section comprising:
 a first internal gear arranged on a first shaft, the first shaft operatively connected to the first input interface;
 a first planet carrier arranged on a second shaft; and,
 a first sun gear arranged on a third shaft, the third shaft operatively connected to the first speed ratio transmission section input;
a second planetary transmission section comprising:
 a second internal gear arranged on a fourth shaft, the fourth shaft operatively connected to the first input interface;
 a second planet carrier arranged on a fifth shaft; and,
 a second sun gear arranged on a sixth shaft, the sixth shaft operatively connected to the second speed ratio transmission section input; and,
a coupling section for coupling the second shaft and the fifth shaft, wherein:
 the second shaft and the fifth shaft are supported against one another in at least one operating mode; and,
 the first planetary transmission section and the second planetary transmission section are arranged coaxially with respect to one another.

2. The transmission of claim 1, wherein at least one of the first speed ratio transmission section and the second speed ratio transmission section is arranged coaxially with at least one of the first planetary transmission section and the second planetary transmission section.

3. The transmission of claim 1, wherein:
the first planetary transmission section engages around the first speed ratio transmission section in an axial direction; or,
the second planetary transmission section engages around the second speed ratio transmission section in an axial direction.

4. The transmission of claim 1, comprising a second input interface for the coupling of an electric motor, the second input interface operatively connected to the second shaft or the fifth shaft.

5. The transmission of claim 1, further comprising:
an output-side coupling actuator apparatus comprising:
 a coupling brake device; and, a first output-side coupling actuator apparatus input coupled to the second shaft and the third shaft.

6. The transmission of claim 5 further comprising a frame, wherein the output-side coupling actuator apparatus is designed to:
rotationally fix the second shaft and the third shaft to one another; or
rotationally fix the third shaft with respect to the frame and form the coupling brake device.

7. The transmission of claim 1 further comprising:
a frame; and,
an input actuator apparatus arranged between the first input interface and the first shaft, wherein the input actuator apparatus is designed to:
rotationally fix the first input interface and the first shaft to one another; or,
rotationally fix the first shaft with respect to the frame; or,
an input actuator apparatus arranged between the first input interface and the fourth shaft, wherein the input actuator apparatus is designed to:
rotationally fix the first input interface and the fourth shaft to one another; or,
rotationally fix the fourth shaft with respect to the frame.

8. The transmission of claim 1, wherein the coupling section is designed such that:
for a co-directional torque at the first shaft and the fourth shaft, and a co-directional torque at the third shaft and the sixth shaft:
a torque at the second shaft operates in an opposite direction to a torque at the fifth shaft.

9. The transmission of claim 1, wherein the coupling section is formed as a transmission section with a negative speed ratio.

10. The transmission of claim 1, wherein:
the first shaft is formed as the first internal gear;
the third shaft is formed as the first sun gear; or,
the second shaft is formed as the first planet carrier.

11. The transmission of claim 1, wherein:
the fourth shaft is formed as the second internal gear;
the sixth shaft is formed as the second sun gear; or,
the fifth shaft is formed as the second planet carrier.

12. A vehicle having the transmission of claim 1.

* * * * *